United States Patent [19]

Toyoda et al.

[11] 4,370,446

[45] Jan. 25, 1983

[54] METHOD FOR MANUFACTURE OF POLYBUTADIENE-MODIFIED UNSATURATED POLYESTER

[75] Inventors: Tsutomu Toyoda; Iwao Maekawa; Hirobumi Izumi; Tadashi Fuzii, all of Hitachi, Japan

[73] Assignee: Hitachi Chemical Company, Ltd., Tokyo, Japan

[21] Appl. No.: 271,698

[22] Filed: Jun. 8, 1981

[30] Foreign Application Priority Data

Jun. 12, 1980 [JP] Japan .................................. 55-79654

[51] Int. Cl.$^3$ ........................ C08G 63/76; C08L 67/04
[52] U.S. Cl. ..................................... 525/36; 526/290; 528/306
[58] Field of Search .................. 526/290; 528/306; 260/22 CB, 22 CQ, 22 M; 525/36

[56] References Cited

U.S. PATENT DOCUMENTS

| | | | |
|---|---|---|---|
| 4,148,765 | 4/1979 | Nelson | 260/22 M |
| 4,202,805 | 5/1980 | Kato et al. | 260/22 M |
| 4,233,432 | 11/1980 | Curtis | 528/306 |
| 4,246,367 | 1/1981 | Curtis | 528/306 |
| 4,299,742 | 11/1981 | Belder et al. | 260/22 M |
| 4,299,950 | 11/1981 | Iwata et al. | 528/306 |

OTHER PUBLICATIONS

Chemical Abstracts, vol. 76, No. 10, Mar. 6, 1972, item 46874K.

*Primary Examiner*—Ronald W. Griffin
*Attorney, Agent, or Firm*—Gordon W. Hueschen

[57] ABSTRACT

A method for the manufacture of a polybutadiene-modified unsaturated polyester, comprising the steps of: (I) reacting (A) an $\alpha,\beta$-unsaturated dicarboxylic acid or anhydride with (B) at least one compound selected from the group consisting of (i) air-drying allyl compounds, (ii) animal and vegetable oils or derivatives thereof and (iii) dicyclopentadiene or derivatives thereof at a (B)/(A) molar ratio within the range of from 0.8 to 1.2, and (II) reacting the resultant reaction product with (C) at least one compound selected from the group consisting of $\alpha,\omega$-polybutadiene glycol and $\alpha,\omega$-hydrogenated polybutadiene glycol. A polybutadiene-modified unsaturated polyester comprising said polybutadiene-modified unsaturated polyester and a polymerizable monomer possessing at least one double bond.

25 Claims, No Drawings

METHOD FOR MANUFACTURE OF POLYBUTADIENE-MODIFIED UNSATURATED POLYESTER

BACKGROUND OF THE INVENTION

1. Field of the Invention

This invention relates to a method for the manufacture of polybutadiene-modified polyesters, to polybutadiene-modified unsaturated polyester resin compositions and to a method for the manufacture of these resin compositions.

2. Description of Prior Arts

Heretofore, polybutadiene-modified unsaturated polyester resin compositions have been manufactured by reacting unsaturated acids including polybasic acids with a liquid hydrogenated polybutadiene having a hydroxy group at an end thereby forming polybutadiene-modified unsaturated polyesters and incorporating therein a polymerizable monomer possessing at least one double bond (Japanese Patent Publication No. 10672/1971). While these polybutadiene-modified unsaturated polyester resin compositions, on setting, give products which excel in water resistance, flexibility, bending property, etc., they have a disadvantage that they set slowly and exhibit poor miscibility with other unsaturated polyester resin compositions. When such compositions are applied to substrates, therefore, they dry slowly and require long standing before they become ready for polishing. Thus, they are hardly usable as cold setting paints. Moreover, they are not readily modified because they have poor miscibility with other unsaturated polyester resin compositions of the kind frequently used as agents for modifying workability and physical properties of other polymers. The excellent properties exhibited by cured products of these polybutadiene-modified unsaturated polyester resin compositions have not been utilized to advantage.

An object of this invention, therefore, is to provide a novel polybutadiene-modified unsaturated polyester, and a method for the manufacture thereof.

Another object of this invention is to provide polybutadiene-modified unsaturated polyester resin compositions which in themselves possess excellent setting property and drying property at room temperature and which are capable of producing set coats excelling in water resistance, flexibility and bending property.

A further object of this invention is to provide a method for the manufacture of polybutadiene-modified unsaturated polyester resin compositions of excellent properties as mentioned above.

SUMMARY OF THE INVENTION

The objects described above are attained according to this invention by a method for the manufacture of polybutadiene-modified unsaturated polyesters which comprises (I) reacting (A) $\alpha,\beta$-unsaturated dicarboxylic acids or anhydrides with (B) at least one compound selected from the group consisting of (i) air-drying allyl compounds, (ii) animal and vegetable oils or derivatives thereof and (iii) dicyclopentadiene or derivatives thereof in a (B)/(A) molar ratio within the range of from 0.8 to 1.2 and (II) subsequently causing the resultant reaction products to be reacted upon by (C) at least one compound selected from the group consisting of $\alpha,\omega$-polybutadiene glycol and $\alpha,\omega$-hydrogenated polybutadiene glycol.

The objects are further attained by the polybutadiene-modified unsaturated polyester resin compositions which are formed by incorporating into the polybutadiene-modified unsaturated polyesters mentioned above (III) a polymerizable monomer possessing at least one double bond.

When the polybutadiene-modified unsaturated polyesters obtained by the method of this invention incorporate a polymerizable monomer possessing at least one double bond, they can be used as polybutadiene-modified unsaturated polyester resin compositions.

The setting property and drying property which these resin compositions exhibit at room temperatures are comparable with those exhibited by the conventional air drying unsaturated polyesters. The set coats which are formed of these resin compositions excel in water resistance, flexibility and bending property. In terms of water resistance and abradability, these set coats far excel the set coats of vinyl ester type, bisphenol type and isophthalic acid type unsaturated polyester resin compositions. Further, the resin compositions of the present invention are compatible with dicyclopentadiene-modified unsaturated polyesters. The polybutadiene-modified unsaturated polyester resin compositions mixed with dicyclopentadiene-modified unsaturated polyesters give set coats which excel in fast adhesion to metal substrates.

PREFERRED EMBODIMENT OF THE INVENTION

According to this invention, the polybutadiene-modified unsaturated polyesters are produced by (I) reacting as component (A) $\alpha,\beta$-unsaturated dicarboxylic acids or anhydrides with as component (B) at least one compound selected from the group consisting of (i) air drying allyl compounds, (ii) unsaturated animal and vegetable oils or derivatives thereof, for example, the fatty acids thereof and the transesters thereof with polyols, and (iii) dicyclopentadiene or derivatives thereof, for example, a hydrozylated dicyclopentadiene, in a (B)/(A) molar ratio within the range of from 0.8 to 1.2 and (II) subsequently causing the resultant reaction products to be reacted upon by as component (C) at least one compound selected from the group consisting of $\alpha,\omega$-polybutadiene glycol and $\alpha,\omega$-hydrogenated polybutadiene glycol. In the step (II), when the reaction product (I) from the step (I) is reacted with component (C), as component (D) either (i) a polyhydric alcohol or (ii) a polybasic acid or both may be incorporated in the reactants.

Typical example of the $\alpha,\beta$-unsaturated dicarboxylic acids or anhydrides usable for the present invention include maleic acid, maleic anhydride, fumaric acid, itaconic acid, and citraconic acid.

Typical examples of the air drying allyl compounds include ethylene glycol monoallyl ether, propylene glycol monoallyl ether, butylene glycol monoallyl ether, neopentyl glycol monoallyl ether, glycerol diallyl ether, trimethylol propane diallyl ether and pentaerythritol triallyl ether which are invariably allyl compounds possessing one hydroxy group.

Typical examples of the animal and vegetable oils include castor oil, soybean oil, linseed oil, cottonseed oil, rice bran oil, tung oil and whale oil. Typical examples of the derivatives thereof include castor oil fatty acid, soybean oil fatty acid, linseed oil fatty acid, cottonseed oil fatty acid, rice bran oil fatty acid and tung oil fatty acid, and transesterified oils obtained by transesterifying the aforementioned animal and vegetable oils with polyols such as ethylene glycol, propylene glycol, glycerol, trimethylol ethane, trimethylol propane, pentaerythritol and neopentyl glycol.

Typical examples of the dicyclopentadiene or derivatives thereof include dicyclopentadiene (tricyclo-[5.2.1.0$^{2,6}$]-decadiene-4,8), hydroxylated dicyclopentadiene (tricyclo-[5.2.1.0$^{2,6}$]-deca-4-en-8-ol, tricyclo-[5.2.1.0$^{2,6}$]-deca-4-en-9-ol) and tricyclodecane dimethylol.

Typical examples of the α,ω-polybutadiene glycol are α,ω-polybutadiene glycols having number-averaged molecular weights in the range of from 1,000 to 3,000, preferably from 1,000 to 2,000. Concrete examples are Arco Chemical Company's Polybd grades R-45, CS-15 and CN-15 and Nippon Soda Co., Ltd.'s Nisso PB-G grade represented by the following formula (1):

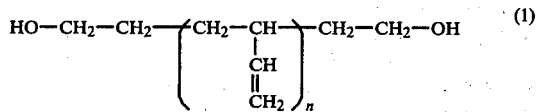

wherein, n is an integer having the value of 15 to 54.

Typical examples of the α,ω-hydrogenated polybutadiene glycol are α,ω-hydrogenated polybutadiene glycols having number-average molecular weights in the range of from 1,000 to 3,000, preferably from 1,000 to 2,000. Concrete examples are Shin-Nippon Rika Co., Ltd.'s HPBG grades represented by the formula (2):

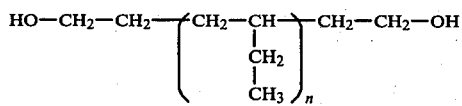

wherein, n is an integer having the value of 15 to 54.

Typical examples of the polyhydric alcohol optionally usable in this invention include ethylene glycol, diethylene glycol, triethylene glycol, propylene glycol, dipropylene glycol, butanediol-1,3, butanediol-1,4, butanediol-2,3, neopentyl glycol, pentanediol-1,5, hexanediol-1,6, 2,2,4-trimethyl pentanediol-1,3, hydrogenated bis-phenol, glycerol, trimethylolethane, trimethylolpropane and adduct of one mol of Bis-phenol A and 2 moles of ethylene oxide or propylene oxide.

Typical examples of the polybasic acid optionally usable in this invention include phthalic anhydride, isophthalic acid, terephthalic acid, tetrahydrophthalic anhydride, hexahydrophthalic anhydride Himic anhydride (trademark designation used for 3,6-endomethylenetetrahydrophthalic anhydride produced by Hitachi Chemical Industry Co., Ltd.), tetrachlorophthalic anhydride, succinic acid, succinic anhydride, adipic acid and sebacic acid.

The reaction of the α,β-unsaturated dicarboxylic acid or anhydride (Component A) with at least one compound selected from the group consisting of (i) air drying allyl compound, (ii) unsaturated animal and vegetable oils or derivatives thereof and (ii) dicyclopentadiene or derivatives thereof (Component B) is carried out in a (B)/(A) molar ratio within the range of from 0.8 to 1.2 under the atmosphere of an inert gas such as nitrogen or carbon dioxide gas at temperatures falling within the range of from 100° to 220° C., preferably from 120° to 170° C. This reaction is terminated at the time that the acid number of the reaction product reaches a level within the range of from 120 to 240, preferably from 150 to 200. When the molar ratio is less than 0.8, the reaction system suffers from excess acid and the reaction does not readily proceed and, worse still, the resin compositions containing the unsaturated polyesters, obtained by this reaction suffer from impaired stability. When the molar ratio exceeds 1.2, the resin compositions suffer from impaired setting property. This (B)/(A) molar ratio is preferred to fall in the range of from 0.95 to 1.1.

The reaction of the compound resulting from the reaction of Component A and Component B in the preceding step (Compound I) with the α,ω-polybutadiene and/or α,ω-hydrogenated polybutadiene (Component C) and the polyhydric alcohol and/or polybasic acid (Component D) optionally used can be performed by an ordinary method adopted for the production of unsaturated polyesters. No specific limit is placed on the proportion of the components involved in the reaction. In this reaction, it is naturally permissible to use the α,ω-polybutadiene glycol and the α,ω-hydrogenated polybutadiene glycol in combination as Component C. This reaction is carried out by heating the reactants at temperatures in the range of from 150° to 220° C., preferably from 170° to 200° C., under the atmosphere of an inert gas such as air or carbon dioxide gas in the presence or absence of a solvent such as toluene or xylene, with continued removal of the water of condensation. This reaction is terminated optionally by the addition of a polymerization inhibitor at the time that the acid number of the reaction product reaches a level in the range of from 5 to 60, preferably from 10 to 30. Consequently, a polybutadiene-modified unsaturated polyester is produced.

A polybutadiene-modified unsaturated polyester resin composition is produced by dissolving a polymerizable monomer possessing at least one double bond (Vinyl Monomer III) in the polybutadiene-modified unsaturated polyester (Polyester II) obtained as described above.

Typical examples of the polymerizable monomer (Vinyl Monomer III) include styrene, chlorostyrene, methyl (meth)acrylate (signifying "methyl acrylate and/or methyl methacrylate," applicable similarly hereinafter), ethyl(meth)acrylate, isopropyl(meth)acrylate, vinyl toluene, α-methylstyrene, ethylene glycol di(meth)acrylate, propylene glycol di-(meth)acrylte, diallyl phthalate, vinyl acetate, tert-butylstyrene and triallyl cyanurate. Although the amount of the polymerizable monomer (Vinyl Monomer III) to be mixed with the polybutadiene-modified unsaturated polyester (Polyester II) is not specifically limited, it is desired to fall within the range of from 40 to 100 parts by weight, preferably from 50 to 70 parts by weight, based on 100 parts by weight of Polyester II, in due consideration of setting property, drying property, water resistance, flexibility, bending property, etc.

To the polybutadiene-modified unsaturated polyester resin composition, a polymerization inhibitor is added in an amount within the range of from 0.001 to 0.1% by weight, preferably from 0.01 to 0.05% by weight, based on the total amount of Polyester (II) and Vinyl Monomer (III). Examples of the polymerization inhibitor usable herein include hydroquinone, p-benzoquinone, tert-butyl catechol, di-tert-butyl catechol, mono-tert-butyl hydroquinone and di-tert-butyl-4-methyl phenol.

The polybutadiene-modified unsaturated polyester resin compositions of the present invention can be blended with dicyclopentadiene-modified unsaturated polyesters (IV) to give products which are further improved in air drying property, setting property and capacity for fast adhesion to metal substrates.

The dicyclopentadiene-modified unsaturated polyester is a resin which is obtained by using dicyclopentadiene or derivatives thereof in addition to components usually adopted for the production of unsaturated polyesters. For example, it may be synthesized by mixing 1 mol of hydroxylated dicyclopentadiene with 0.5 mol of propylene glycol and subjecting the resultant mixture to a treatment usually followed in the production of unsaturated polyesters.

When the polymerizable monomer, the polybutadiene-modified and the dicyclopentadiene-modified unsaturated polyester are mixed, no specific limit is placed to their proportions. They can be mixed in amounts suitably selected to suit the properties the final product is expected to acquire. Preferably, the mixing of the components may be effected by preparatorily dissolving the polybutadiene-modified unsaturated polyester and the dicyclopentadiene-modified unsaturated polyester separately in portions of the polymerizable monomer and subsequently blending the solutions. In this case, the amount of the polymerizable monomer (III) to be used in the mixing is desired to fall in the range of from 40 to 100 parts, preferably from 50 to 100 parts, based on 100 parts by weight of the total of the polybutadiene-modified unsaturated polyester and the dicyclopentadiene-modified unsaturated polyester.

The polybutadiene-modified unsaturated polyester resin composition according to this invention may be set by using, as the curing agent, an organic peroxide such as benzoyl peroxide, methylethylketone peroxide, cyclohexanone peroxide, cumene hydroperoxide, acetylacetone peroxide, lauroyl peroxide and tert-butyl hydroperoxide, in an amount desirably within the range of 0.5 to 5% by weight, preferably 1 to 2% by weight, based on the weight of the composition. Optionally, one or more members selected from the group consisting of naphthenates, octenates and other metal soaps including, for example, cobalt naphthenate, cobalt octenate, magneses naphthenate, iron naphthenate, copper naphthenate, zinc naphthenate, zirconium naphthenate and lead naphthenate, may be used as the promoter and dimethyl aniline, diethyl aniline, acetyl acetone, dimethyl acetamide or quaternary ammonium salts may be used as an aid to the promoter.

Optionally, the polybutadiene-modified unsaturated polyester resin composition of the present invention may incorporate, to suit the intended use, an inorganic filler such as calcium carbonate, magnesium carbonate, calcium sulfate, alumina, clay, talc, silica, diatomaceous earth or powdered mica, an ultraviolet ray absorbent such as phenyl salicylate, 1-(2'-hydroxyl-5-methylphenyl)benzotriazole, 2-hydroxy-4-methoxy-benzophenone or 2,2'-dihydroxy-4-methoxy-benzophenone, a thermoplastic resin such as polystyrene, polyetheylene, polyvinyl acetate, polymethyl methacrylate or saturated polyester, a dye or a pigment.

Again, optionally, the resin composition of this invention may be set under a light source such as, for example, a mercury vapor lamp, a tungsten lamp or a xenone lamp in the presence of an ultraviolet ray curing agent such as, for example, benzoin, benzoin methyl ether, benzoin ethyl ether, benzoin isopropyl ether, diphenyl disulfide, di-β-naphthyl sulfide, 4,4'-dimethyl disulfide or 2,2', 4,4'-tetrachloro-disulfide which is added in an amount within the range of 0.5 to 5% by weight based on the weight of the resin composition.

The polybentadiene-modified unsaturated polyester resin composition of the present invention forms a coat of excellent adhesiveness on the surface of a metal substrate such as steel plate or tin plate when it is applied to the metal substrate by the technique of spray coating, electrostatic coating, brush coating, flow coating or roll coating and then left to set under the atmosphere of air at a varying temperature to be selected depending on the kind of the catalyst in use, generally within the range of 5° to 150° C.

Now, the present invention will be described specifically with reference to working examples. Wherever parts and percents are mentioned, they are meant parts and percents by weight unless otherwise specified.

EXAMPLE 1

Under an atmosphere of nitrogen gas, 2 mols of maleic anhydride was caused to react upon 2 mols of trimethylol propane diallyl ether to produce a compound having an acid number of 180. This compound was cooled to 70° C. and 0.5 mol of α,ω-polybutadiene glycol (a product having a number-averaged molecular weight of 2,000, made by Nippon Soda Co., Ltd. and marketed under trademark designation of Nisso PB-G-2,000) and 0.5 mol of α,ω-hydrogenated polybutadiene glycol (a product having a number-averaged molecular weight of 2,000 and made by Shin-Nippon Rika Co., Ltd.) were added thereto and made to react thereon at 170° C., to produce a polybutadiene-modified unsaturated polyester having an acid number of 20. In 70 parts of this resin, 30 parts of styrene and 0.03 part of hydroquinone were dissolved to produce a resin compound (A).

The resin composition (A), with 1.0% of cobalt naphthenate (having a metal content of 6%) and 1.0% of Permeck N (55% methylethyl ketone peroxide made by Nippon Oils and Fats Co., Ltd.) incorporated therein, was applied with a powered spray gun (2.5 mm in nozzle diameter, made by Iwata Coater Co., Ltd. and marketed under trademark designation of Wider 60) at 25° C. to a cold-drawn steel sheet 0.8 mm in thickness abraded in advance with a water-resistant paper, #150, to form thereon a film of 20 g/60 mm×150 mm.

EXAMPLE 2

Under an atmosphere of nitrogen gas, 1 mol of glycerol and 3 mols of linseed oil fatty acid were subjected to esterification at 200° C. to produce linseed oil fatty acid glyceride. Then under an atmosphere of nitrogen gas, 2 mols of this linseed oil fatty acid glyceride was made to react with 2 mols of maleic anhydride at 150° C. to produce a compound having an acid number of 120. This compound was cooled to 70° C. and 1 mol of the same α,ω-polybutadiene glycol (PB-G-2,000) as used in Example 1 was made to react thereon, to produce a polybutadiene-modified unsaturated polyester having an acid number of 17. In 70 parts of this resin were dissolved 30 parts of styrene and 0.03 part of hydroquinone, to produce a resin composition (B).

The resin composition (B), with the hardening promoter and the hardening agent of Example 1 similarly incorporated, was applied to a steel sheet to form a film thereon.

EXAMPLE 3

Under an atmosphere of nitrogen gas, 2 mols of maleic anhydride was made to react upon 2.2 mols of hydroxylated dicyclopentadiene to produce a compound having an acid number of 200. This compound was cooled to 50° C. and 1 mol of the same α,ω-polybutadiene glycol (Nisso PB-G-2,000) as used in Example 1 was made to react thereon to produce a polybutadiene-modified unsaturated polyester having an acid number of 15. In 70 parts of this resin were dissolved 30 parts of styrene and 0.03 part of hydroquinone to produce a resin composition (C).

The resin composition (C), with the hardening promotor and the hardening agent of Example 1 similarly incorporated, was applied to a steel sheet to form a film thereon.

EXAMPLE 4

Under an atmosphere of nitrogen gas, 2 mols of maleic anhydride was made to react upon 2 mols of hydroxylated dicyclopentadiene at 100° C., to produce a compound having an acid number of 200. This compound was cooled to 50° C. and 0.5 mol of α,ω-polybutadiene glycol (a product having a number-averaged molecular weight of 1,000, made by Nippon Soda Co., Ltd. and marketed under trademark designation of Nisso PB-G-1,000) and 0.6 mol of dipropylene glycol were made to react thereon at 180° C., to produce a polybutadiene-modified unsaturated polyester having an acid number of 25. In 70 parts of this resin were dissolved 30 parts of styrene and 0.03 part of hydroquinone to produce a resin composition (D).

With the hardening promoter and the hardening agent of Example 1 similarly incorporated, this resin composition (D) was applied to a steel sheet to form a film thereon.

EXAMPLE 5

Under an atmosphere of nitrogen gas, 0.9 mol of maleic anhydride, 0.1 mol of adipic acid, 0.9 mol of propylene glycol and 0.4 mol of hydroxylated dicyclopentadiene were made to react at 170° C., to produce a dicyclopentadiene-modified unsaturated polyester having an acid number of 30. In 70 parts of this resin were dissolved 30 parts of styrene and 0.03 part of hydroquinone. The resultant solution was blended with 100 parts of the resin composition (D) to prepare a resin composition (E).

This resin composition (E), with the hardening promoter and the hardening agent similarly incorporated, was applied to a steel sheet to form a film thereon.

Control 1

One mol of maleic anhydride was reacted upon by 1 mol of α,ω-hydrogenated polybutadiene glycol (a product having a number-averaged molecular weight of 2,000, made by Shin-Nippon Rika Co., Ltd.) at 160° C., to produce a polybutadiene-modified unsaturated polyester having an acid number of 25. In 70 parts of this resin were dissolved 30 parts of styrene and 0.03 part of hydroquinone, to produce a resin composition (F).

This resin composition (F), with the hardening promotor and the hardening agent of Example 1 similarly incorporated, was applied to a steel sheet to form a film thereon.

Control 2

Under an atmosphere of nitrogen gas, 0.8 mol of maleic anhydride, 0.2 mol of phthalic anhydride, 0.7 mol of ethyelene glycol, 0.1 mol of the same linseed oil fatty acid glyceride as used in Example 2 and 0.4 mol of dicyclopentadiene were made to react at 200° C., to produce a dicyclopentadiene-modified unsaturated polyester. In 70 parts of this resin were dissolved 30 parts of styrene and 0.03 part of hydroquinone to produce a resin composition (G).

This resin composition (G), with the hardening promoter and the hardening agent of Example 1 similarly incorporated, was applied to a steel sheet to form a film thereon.

Control 3

Under an atmosphere of nitrogen gas, 0.8 mol of fumaric acid, 0.2 mol of isophthalic acid and 1.1 mols of hydrogenated Bisphenol A were made to react at 210° C., to produce an unsaturated polyester having an acid number of 30. In 70 parts of this resin were dissolved 30 parts of styrene and 0.03 part of hydroquinone to produce a resin composition (H).

This resin composition (H), with the hardening promoter and the hardening agent of Example 1 similarly incorporated, was applied to a steel sheet to form a film thereon.

The films obtained were tested for various properties. The results are shown in Table 1.

TABLE 1

| | Coated film property | | | | | | | |
| | Resin composition | | | | | | | |
| Items | A | B | C | D | E | F | G | H |
| --- | --- | --- | --- | --- | --- | --- | --- | --- |
| Track free time[1] (min.) | 60 | 90 | 60 | 30 | 30 | — | 50 | — |
| Dry surface time[2] (min.) | 120 | 160 | 110 | 90 | 60 | unmeasurable | 120 | about 1,500 |
| Surface hardness[3] | 50 | 40 | 60 | 70 | 80 | 5 | 60 | 90 |
| Fast adhesion to steel sheet[4] | Δ | Δ | o | o | o | o | o | x |
| Flexibility[5] | o | o | o | o | o | o | Crack | crack |

TABLE 1-continued

| | Coated film property | | | | | | | |
|---|---|---|---|---|---|---|---|---|
| | Resin composition | | | | | | | |
| Items | A | B | C | D | E | F | G | H |
| Blistering property[6] (days) | >10 | >10 | >10 | >10 | >10 | 5 | 3 | 8 |

Note:
[1]Tack free time - Time elapsing before the applied film ceased to stick to the finger tip brought into light contact with the film.
[2]Dry surface time - Time elapsing before the applied film lost its viscosity so that light pressure applied thereto by the finger tip ceased to leave a fingerprint mark on the film surface.
[3]Surface hardness - Measured with a durometer 24 hours after formation of the film.
[4]Fast adhesion to steel sheet - Measured by bending the sheet 24 hours after the formation of the film and rated on the scale (o denoting high adhesion, Δ fast adhesion in about 50% of contact surface and x substantial absence of adhesion).
[5]Flexibility - Measured by bending the sheet 24 hours after the formation of the film (180°).
[6]Blistering property - Length of time (in days) of the film's standing under water at 40° C. until blisters were formed in the interface between the film and the steel sheet.

The resin compositions obtained by mixing polybutadiene-modified unsaturated polyesters produced by the method of this invention with polymerizable monomers possessing at least one double bond possessed the same degrees of hardening property and drying property as those of ordinary air-drying unsaturated polyester resins even under room temperature, and they exhibited resistance to water, fast adhesion to metal substrates, flexibility and blistering property at improved levels. The resin compositions additionally incorporating dicyclopentadiene-modified unsaturated polyesters exhibited the same degrees of properties.

What is claimed is:

1. A method for the manufacture of a polybutadiene-modified unsaturated polyester, comprising the steps of:
   (I) preparing a reaction product by reacting as component (A) an α,β-unsaturated dicarboxylic acid or anhydride with as component (B) at least one compound selected from the group consisting of (i) air-drying allyl compounds, (ii) unsaturated animal and vegetable oils, the fatty acids thereof, and the transesters thereof with polyols, and (iii) a dicyclopentadiene or a hydroxylated cyclopentadiene at a (B)/(A) component molar ratio within the range of from 0.8 to 1.2, and
   (II) thereafter reacting the resultant product with as component (C) at least one compound selected from the group consisting of α,ω-polybutadiene glycol and α,ω-hydrogenated polybutadiene glycol.

2. A method according to claim 1, wherein the reaction of component (A) with component (B) is carried out at temperatures in the range of from 100° to 220° C.

3. A method according to claim 2, wherein (B)/(A) component molar ratio is in the range of from 0.95 to 1.1.

4. A method according to claim 2, wherein the reaction product (I) between component (A) and component (B) has an acid number in the range of from 120 to 240.

5. A method according to claim 1, wherein the reaction product (I) between component (A) and component (B) is made to react with component (C) in the presence of as component (D) at least one compound selected from the group consisting of polyhydric alcohols and polybasic acids.

6. A method according to claim 1, wherein the polybutadiene-modified unsaturated polyester has an acid number in the range of from 5 to 60.

7. A method according to claim 1, wherein component (B) is an air-drying allyl compound.

8. A method according to claim 1, wherein component (B) is at least one member selected from the group consisting of unsaturated animal and vegetable oils, the fatty acids thereof, and the transesters thereof with polyols.

9. A method according to claim 1, wherein component (B) is a dicyclopentadiene or a hydroxylated cyclopentadiene.

10. A polybutadiene-modified unsaturated polyester, obtained by:
    (I) preparing a reaction product by reacting as component (A) an α,β-unsaturated dicarboxylic acid or anhydride with as component (B) at least one compound selected from the group consisting of (i) air-drying allyl compounds, (ii) unsaturated animal and vegetable oils, the fatty acids thereof, and the transesters thereof with polyols, and (iii) a dicyclopentadiene or a hydroxylated cyclopentadiene at a (B)/(A) component molar ratio within the range of from 0.8 to 1.2, and (II) thereafter reacting the resultant reaction product with as component (C) at least one compound selected from the group consisting of α,ω-polybutadiene glycol and α,ω-hydrogenated polybutadiene glycol.

11. A polyester according to claim 10, wherein the polyester has an acid number in the range of from 5 to 60.

12. A polybutadiene-modified unsaturated polyester resin composition, comprising a polybutadiene-modified unsaturated polyester and (III) a polymerizable monomer possessing at least one double bond, said polybutadiene-modified unsaturated polyester being obtained by
    (I) preparing a reaction product by reacting as component (A) an α,β-unsaturated dicarboxylic acid or anhydride with as component (B) at least one compound selected from the group consisting of (i) air-drying allyl compounds, (ii) unsaturated animal and vegetable oils, the fatty acids thereof, and the transesters thereof with polyols, and (iii) a dicyclopentadiene or a hydroxylated cyclopentadiene at a (B)/(A) component molar ratio within the range of from 0.8 to 1.2, and (II) thereafter reacting the resultant reaction product with as component (C) at least one compound selected from the group consisting of α,ω-polybutadiene glycol and α,ω-hydrogenated polybutadiene glycol.

13. A composition according to claim 12, wherein the (B)/(A) component molar ratio is in the range of from 0.95 to 1.1.

14. A composition according to claim 12, wherein the reaction product (I) between component (A) and component (B) has an acid number in the range of from 120 to 240.

15. A composition according to claim 12, wherein the reaction product (I) between component (A) and component (B) is made to react with component (C) in the presence of as component (D) at least one compound selected from the group consisting of polyhydric alcohols and polybasic acids.

16. A composition according to claim 12, wherein the polybutadiene-modified unsaturated polyester has an acid number in the range of from 5 to 60.

17. A composition according to claim 12, wherein component (B) is an air-drying allyl compound.

18. A method according to claim 12, wherein component (B) is at least one member selected from the group consisting of unsaturated animal and vegetable oils, the fatty acids thereof, and the transesters thereof with polyols.

19. A composition according to claim 12, wherein component (B) is the a dicyclopentadiene and or a hydroxylated cyclopentadiene.

20. A composition according to claim 12, wherein the polymerizable monomer (III) possessing at least one double bond is incorporated in an amount in the range of from 50 to 100 parts by weight, based on 100 parts by weight of the polybutadiene-modified unsaturated polyester.

21. A composition according to claim 12, which further comprises (IV) a dicyclopentadiene-modified unsaturated polyester.

22. A composition according to claim 21, wherein the polymerizable monomer (III) possessing at least one double bond is incorporated in an amount in the range of from 50 to 100 parts by weight, based on 100 parts by weight of the total of the polybutadiene-modified unsaturated polyester (I) and the dicyclopentadiene-modified unsaturated polyester (IV).

23. A method for the manufacture of a polybutadiene-modified unsaturated polyester resin composition, which comprises mixing a polybutadiene-modified unsaturated polyester according to claim 10 with a polymerizable monomer possessing at least one double bond.

24. A composition according to claim 1, in which component (B) comprises a hydroxylated dicyclopentadiene.

25. A composition according to claim 12, in which component (B) comprises a hydroxylated dicyclopentadiene.

* * * * *

UNITED STATES PATENT AND TRADEMARK OFFICE
CERTIFICATE OF CORRECTION

PATENT NO. : 4,370,446

DATED : January 25, 1983

INVENTOR(S) : Tsutomu Toyoda, Iwao Maekawa, Hirobumi Izumi and Tadashi Fuzii

It is certified that error appears in the above-identified patent and that said Letters Patent is hereby corrected as shown below:

Col. 2, line 64; insert before "animal" the word -- unsaturated --

Signed and Sealed this

Fourteenth Day of June 1983

[SEAL]

Attest:

DONALD J. QUIGG

Attesting Officer

Acting Commissioner of Patents and Trademarks